R. B. Tunstall,
Seeder.

No. 91,386. Patented June 15, 1869.

Witnesses:
Jno. A. Brooks
Geo. W. Mabee

Inventor:
R. B. Tunstall
by Munn & Co.
Attys.

United States Patent Office.

ROBERT B. TUNSTALL, OF NORFOLK, VIRGINIA.

Letters Patent No. 91,386, dated June 15, 1869.

IMPROVEMENT IN SEEDERS.

The Schedule referred to in these Letters Patent and making part of the same.

*To all whom it may concern:*

Be it known, that I, ROBERT B. TUNSTALL, of Norfolk, in the county of Norfolk, and State of Virginia, have invented a new and improved Seeder; and I do hereby declare that the following is a full, clear, and exact description thereof, which will enable others skilled in the art to make and use the same, reference being had to the accompanying drawings, forming part of this specification.

This invention relates to improvements in seeding-machines, designed to provide a simple and efficient hand-apparatus for sowing and covering small seeds, and arranged to be adjusted for sowing thicker or thinner, as required; also for seeds of various sizes.

The invention consists in the arrangement, upon a vehicle resembling a common wheelbarrow without a box, of a seeding-wheel, having numerous seeding-chambers radiating from the centre, and having adjustable openings at the periphery for discharging the seed, which is rotated by gearing with the axle of the supporting-wheel, which is made heavy, and forms the drill or groove for the seed. A chain and roller are applied, for covering and pressing the seed, all as hereinafter more fully specified.

Similar letters of reference indicate corresponding parts.

Figure 1:
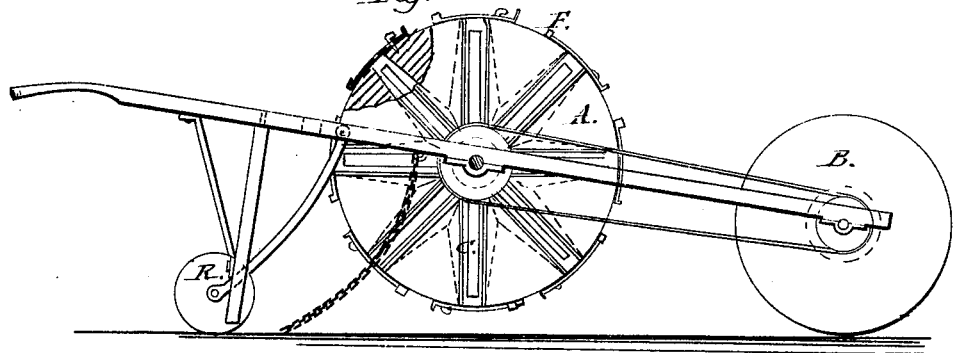
Figure 1 represents a side elevation of my improved machine.
Figure 2:
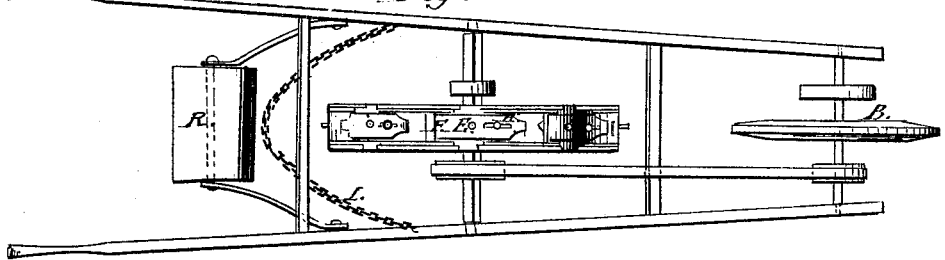
Figure 2 represents a plan view of the same.
Figure 3:
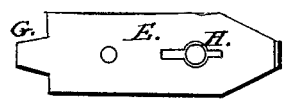
Figures 3 and 4 represent details.
Figure 4:
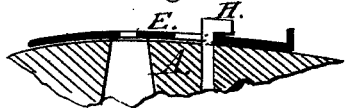

A represents a seeding-wheel, mounted transversely on a wheelbarrow-shaped vehicle, and deriving rotary motion from the shaft of the wheel B, on which the machine rolls, and which is made of heavy material, and shaped in the face so as to readily form the groove or drill for the seed.

The seed-wheel A is provided with numerous seed-chambers, C, radiating from the centre, and opening through the periphery for discharging the seed. These chambers are preferably covered on the outer face with glass, to enable the operator to see the seed.

The openings in the periphery of the wheel are designed to be varied in their capacity to deliver seed, by detachable perforated plates, E, having openings of various sizes, and arranged to be readily connected to the wheel by staples, F, projecting from the periphery of the said wheel, under which the reduced ends G of the plates are engaged, and the buttons H, projecting from the wheel, and passing through slots in the said plates.

The wheel A may be driven faster or slower, as required, by suitable cone-pulleys or other means.

For covering the seed, I provide a chain, I, so arranged as to drag along the groove after the wheel A, to cover the seed; and behind this chain, I arrange a roller, R, suspended in arms from the frame, to roll over the drill or groove, and pack the ground upon the seed.

Having thus described my invention,

I claim as new, and desire to secure by Letters Patent—

1. The combination of the seed-wheel A with the wheel B and supporting-frame, all substantially as specified.

2. The seed-wheel A, constructed as described, and provided with the detachable plates E, substantially as specified.

3. The combination, with the wheel A, arranged and operated as described, of the chain and roller, arranged substantially as specified.

ROB. B. TUNSTALL.

Witnesses:
ROBT. T. BAYLOR,
T. W. HENDERSON.